United States Patent [19]

Shim

[11] Patent Number: 5,056,822
[45] Date of Patent: Oct. 15, 1991

[54] PAD OR MAP HOLDING DEVICE

[76] Inventor: Henry H. Shim, 1124 S. Kingsley Dr., Los Angeles, Calif. 90006

[21] Appl. No.: 559,658

[22] Filed: Jul. 30, 1990

[51] Int. Cl.⁵ ............................................... B42D 17/00
[52] U.S. Cl. ......................................... 281/44; 281/45; 281/51; 224/276; 40/643
[58] Field of Search ................. 281/44, 45, 12, 51; 40/643; 248/447; 224/276

[56] References Cited

U.S. PATENT DOCUMENTS

| 1,344,498 | 6/1920 | Fox | 281/44 |
| 1,636,275 | 7/1927 | Bell et al. | 281/44 |
| 1,768,266 | 6/1930 | O'Connell | 281/45 |
| 1,892,721 | 1/1933 | Cardarelli | 248/447.2 |
| 2,082,246 | 6/1937 | Hollingsworth | 40/643 |
| 2,142,030 | 12/1938 | Lambert | 281/12 |
| 2,167,731 | 8/1939 | Swanstrom | 224/276 |
| 2,201,789 | 5/1940 | Robilotto | 224/276 |
| 2,202,267 | 5/1940 | Posnack | 281/51 |
| 2,491,009 | 12/1949 | Lawrence | 224/276 |
| 2,661,222 | 12/1953 | Wolfe | 281/45 |
| 2,663,576 | 12/1953 | Berman | 281/12 |
| 2,810,221 | 10/1957 | Reifsnyder | 40/643 |
| 3,539,204 | 11/1970 | Keller | 281/45 |
| 3,620,498 | 10/1969 | Tunkl | 281/51 |
| 4,166,559 | 9/1979 | Richardson | 40/643 |
| 4,470,571 | 9/1984 | Hartman | 281/45 |
| 4,726,607 | 2/1988 | White | 224/276 |

Primary Examiner—Frank T. Yost
Assistant Examiner—Hwei-Siu Payer
Attorney, Agent, or Firm—Julius L. Rubinstein

[57] ABSTRACT

An elongated map or pad holding device has a clamp at one end for attachment at a single location to a portion of a device, and a clamp attached to the opposite end of the device so that a pad or map can be held between the jaws or plates of the clamp.

4 Claims, 1 Drawing Sheet

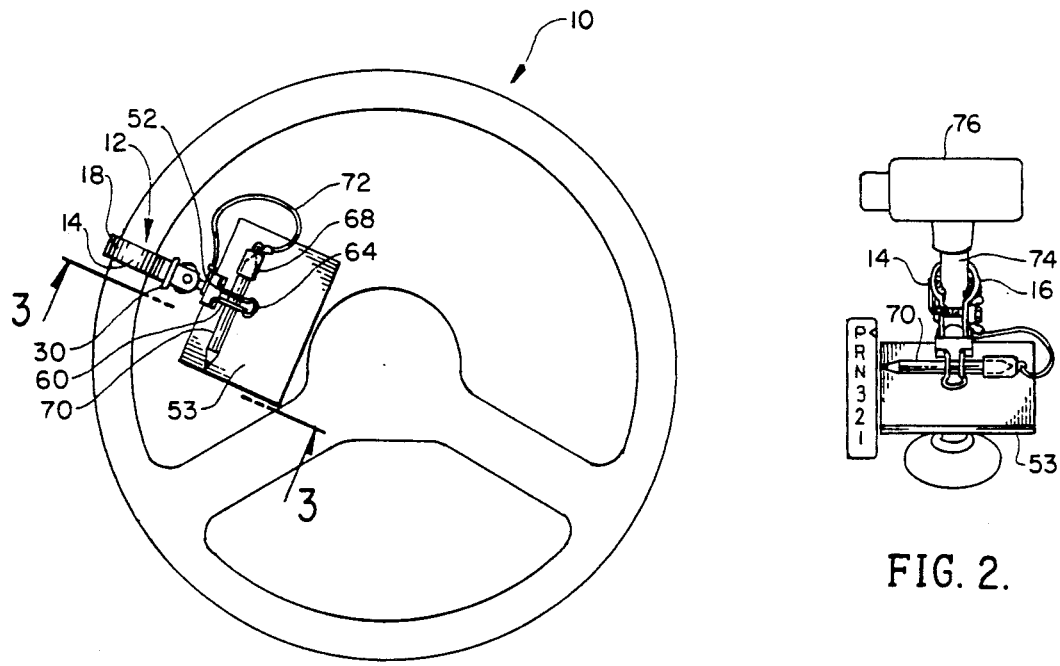
FIG. 1.
FIG. 2.
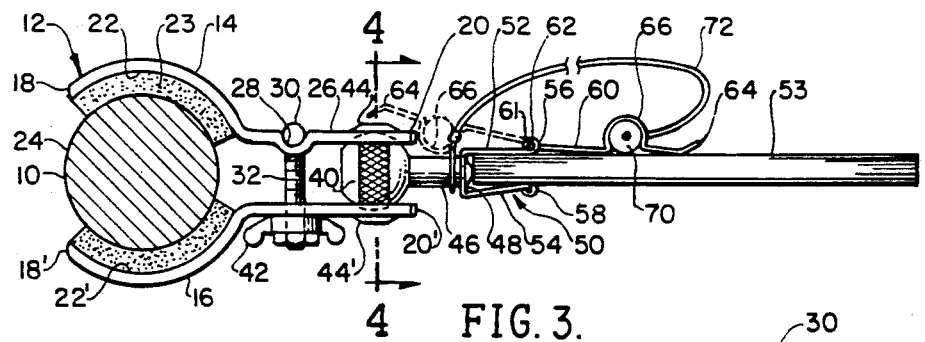
FIG. 3.
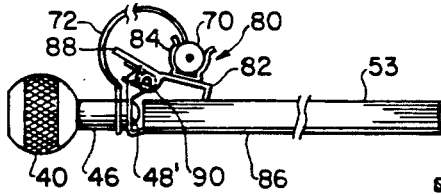
FIG. 6.
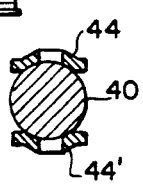
FIG. 4.
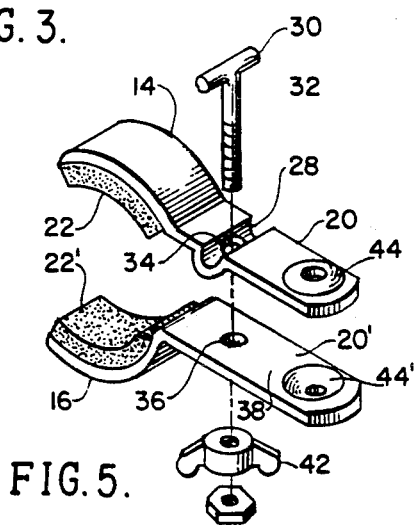
FIG. 5.

PAD OR MAP HOLDING DEVICE

This invention relates generally to an emergency pad or map holder, and more particularly to a pad or map holder which can be detachably mounted on a suitable device such as a steering wheel or a gear shift lever or the like.

DESCRIPTION OF PRIOR ART

In the past numerous efforts have been made to secure a note pad to a steering wheel of a vehicle. Some, as exemplified by U.S. Pat. No. 2,810,221, to Reifsnyder, were expensive to manufacture and difficult to install. In addition, depending on the location of the instruments, the note pad obscured the instruments, so this type of device proved to be impractical.

Other devices such as U.S. Pat. No. 4,166,559 to Richardson, were designed differently but they had the same defects in that they were expensive and difficult to construct, and they blocked the view of the instruments.

Other patents, such as U.S. Pat. No. 4,726,607 to White, utilized a clipboard attached to the top and bottom of the steering wheel, but such a device constructed according to this patent blocked the view of the instrument panel.

Additional patents such as U.S. Pat. No. 1,892,721 to Cardarelli were limited to steering wheels with spokes for installation. Moreover, the length of the pad had to be specially designed to fit the separation of the spokes and the diameter of the steering wheel.

Other patents, such as U.S. Pat. No. 2,663,576 to Berman although designed differently than the patents described above, had same basic problems; they were expensive to make, difficult to install, and they obscured the view of the instrument panels. The same objections are true for U.S. Pat. No. 2,662,222 to Wolfe.

However, the basic objection to all the above described patents is that they were designed for steering wheels for motor vehicles, which are generally circular and in addition the prior art references were attached to the steering wheel at more than one location, thereby blocking a view of all or part of the instrument panel. In contrast, in the present invention, the pad or map holder is secured to a steering device at only one location on a single position on the rim of a steering wheel or in a position that does not obscure the vision of the driver while looking at the pad or map, thus enabling the device to be attached to joy sticks of airplanes, the gear shifts of automobiles, or steering wheels composed of two arcuate segments.

In summary and as shown in the art cited, the prior map or pad holder were designed for conventional steering wheels only. In contrast, the map or pad holder described herein can be attached to any device, or to any part of a device which has a shaft and is pivotally movable with respect to the shaft.

BRIEF SUMMARY AND STATEMENT OF OBJECTIVES

The pad or map holding device is formed from a pair of generally identical bars. One end of the bars is arcuate and the bars are positioned so the concave surfaces of the arcuate ends of the bars face each other in assembled relationship for attachment at a single location to an object. The arcuate concave surfaces are large enough to fit around the cross sectional diameter of any part of an object such as a steering wheel. The opposite ends of the bars are generally straight a ball-like swivel. The facing surfaces of the bars are provided with spherical recesses adjacent the opposite end of the bars in which a portion of a ball like swivel sits. Each bar is provided with screw receiving openings, for receiving a lock screw with its wing nut. When the screw is tightened, the concave surfaces of the bars are clamped around the periphery of the steering wheel and at the same time, the opposite ends of the bars are tightened around the periphery of the spherical ball. The spherical recesses in which the ball-like swivel rests permits the straight portion of the bar to tightly engage the ball-like swivel even if the straight portions of the bars are not parallel to each other because of the difference in diameter between the diameter of the cross section of the steering wheel and the diameter of the ball-like swivel. With this arrangement both the rim of the steering wheel and the ball-like swivel are tightly retained gripped between the bars when the screw is tightened by the wing nut.

One end of the ball-like swivel is attached to the web of a resilient clamp. The clamp comprises two resilient portions connected together by a web portion. One side of the clamp is provided with an elongated lever like portion. This portion is provided with a generally semi-circular pencil holding recess disposed intermediate to its ends. A part of the lever-like portion extending beyond the pencil holding recess serves as a lever so that when the lever-like portion is lifted, the resilient jaws of the clamp are separated releasing the pad or map clamped between them. In this way the pad and writing instrument can be moved with the ball-like swivel to any convenient position, without interfering with hands of the driver or the instruments of the machine.

What is needed therefore and comprises an important object of this invention is to provide an emergency pad holding device which is economical to make, easy to install, and when installed will not interfere with a view of the instrument panel of the car, aircraft, or boat.

Another object of this invention is to provide an emergency pad holding device with a pencil holding recess for holding a pencil when there is no pad in the pad holding device, and where the clamp operating lever can be pivoted to an out of the way position when not in use.

These and other objects of this invention will become more apparent when better understood in the light of the accompanying specification and drawing wherein:

FIG. 1 is a plan view of a steering wheel with the pad holding device attached to the periphery of the steering wheel.

FIG. 2 is perspective view of the pad holding device attached to the gear shift lever.

FIG. 3 is a side elevational view, partly in section showing the pad holding device holding a pad of paper and a writing instrument.

FIG. 4 is a sectional view taken on the line 4—4 of FIG. 3.

FIG. 5 is an exploded perspective view of the pad holding clamp.

FIG. 6 is an alternate embodiment of the pad or map clamping device.

Referring now to FIG. 1 of the drawing, a steering device 10 for a motor vehicle, airplane, or boat, as shown in the embodiment disclosed in FIG. 1, is a circular steering wheel, such as in a motor vehicle. It is, however, to be understood that the steering device could have other configurations, such as spaced arcuate segments or a joy stick for airplanes, all connected to a steering mechanism, and the invention described below could be attached to other kinds of steering devices.

Referring now to FIG. 3 a clamp indicated generally by the reference numeral 12 comprises preferably identical spaced bars 14 and 16, (although it is contemplated that the bars need not be identical). The spaced bars have arcuate ends 18 and 18' on one end of the bars. The opposite ends 20 and 20' of the bars 14 and 16 are generally straight. As Shown in FIG. 2, the arcuate portions 18 and 18' of the bars 14 and 16 have a curve which is generally concentric with the outer periphery of the arcuate portion of the steering wheel 10. A layer of elastomeric material is secured to the concave surface 23 and 22' of the arcuate ends 18 and 18' and this elastomeric material engages the outer periphery 24 of the steering wheel 10 in a tight non-slip manner.

The intermediate portion 26 of bar 14 is provided with a generally semi- cylindrical recess 28 for receiving the head 30 of toggle bolt 32. The toggle bolt 32 extends through an opening 34 in the base of the semi-cylindrical recess 28 and on through a correspondingly positioned somewhat smaller opening 36 in bar 14 and is screwed onto a wing nut 42 as shown in FIGS. 3 and 5. In this way the toggle bolt can pivot to accomodate the screw. With this arrangement the toggle bolt and screw and be tightened even if the bars are not completely aligned.

The generally straight end portions 20 and 20' of bars 14 and 16 are provided with semi-spherical recesses 44 and 44' facing each other and shaped to receive the generally spherical ball-like swivel 40, see FIG. 4. With this arrangement when the wing nut 42 is tightened, see FIG. 3 and 5, portions 18 and 18' of the clamp are clamped to the arcuate portion 24 of the steering wheel and at the same time, the swivel ball 40 is clamped between the rear portions 20 and 20' even if the rear portions 20 and 20' of bars 14 and 16 ar not parallel to each other.

A stem 46 is secured to and extends out from the spherical ball 40 in a direction transverse to the axis of the toggle bolt 32. This stem is secured to the web 48 of a generally conventional clamp 50. The clamp is formed from two flat clamping plates 52 and 54 resiliently connected to the web 48 of the clamp and in such a way that the plates 52 and 54 of the clamp are inclined toward each other with their distal ends 56 and 58 engaging each other. Since the material forming the clamp is very resilient and spring like, the engagement of the distal ends 56 and 58 of plates 52 and 54 is strong enough to hold a note pad 53 between them in a horizontal position.

As stated above the plates 52 and 54 of the clamp 50 are biased toward each other and the spring force is strong enough to securely hold note pad. Because of the strength of the clamp, a mechanism is required to force the plates 52 and 54 apart so the note pad 53 can be removed and replaced when exhausted. This mechanism comprises a lever 61 pivotally secured to the distal end of the plate 52 by any suitable means. In this embodiment, the lever comprises spaced wires pivotally mounted at one end 62 to the distal end of plate 52, see FIG. 3. The opposite end 64 of the lever 60 is bent upward to provide space to pry up plate 52 and thereby release the pad. The material forming lever 60 is, in this embodiment, spaced resilient wires. Intermediate to the ends 62 and 64 of the lever 60 is an upwardly projecting downwardly open arcuate recess 66 sized to hold the cap 68 of a pen or pencil 70. A coil type string 72 is secured at one end to the stem 46, or some other suitable spot, and the other end is secured to the cap 68 which receives a writing instrument, see FIG. 1. A recess 66 is formed in the spaced wires and the recess is sized to securely grip a writing instrument 70. When the writing pad is exhausted and has to be replaced, the distal end 64 of the lever 60 is pried up and this permits the exhausted pad 53 to be removed and replaced by a full one.

The lever 60 is pivotally secured to the distal end of plate 52 on pivot 61 see (FIG. 3). With this arrangement the lever 60 can be pivoted 180 degrees to the position shown in dotted lines in FIG. 3. In this position the recess is upwardly open and gravity helps hold the writing instrument in the recess.

As stated above, this pad or map holder is adaptable to be attached to other configurations of steering devices besides a steering wheel, i.e. a steering device composed of two semi-circular segments as in some airplanes, or on the joy stick of an airplane, or on the gear shift of a motor vehicle. Since, as seen in FIG. 1, the clamp need only embrace a small part of the steering wheel, the clamp can be attached the same way to the stem or shaft portion 74 of any device, such as the shaft of a gear shift lever 76 as shown in FIG. 2, or the joy stick (not shown) of an airplane. It would be particularly useful when a map is to be attached to the joy stick of an airplane.

Referring now to FIG. 6 an alternate embodiment of the clamping means 80 is shown. The clamp comprises a first 82 and a second plate 86 on which the pad rests. The first and second plates 82 and 86 are connected together by the spring clamp 48 which is attached to the distal end of the stem 46, see FIG. 6. Means bias the first and second plates together to tightly grip a map or pad. A spring biased writing instrument holding pencil holding clip 84 is mounted on the back of first plate 82, see FIG. 6. The bottom plate 86 is strong and sized to give support to the pad or map when pressure is applied while writing on it. A release lever 88 is secured to the portion of plate 82 on the opposite side of pivot 90. This lever when pressed raises the first plate 82 off the pad 53, so that the pad can be removed and replaced when it is exhausted.

Having described the invention, what I claim as new is:

1. A map or pad holding device comprising a pair of elongated bars, one end of said bars arcuate and the bars positioned so the concave surfaces of said arcuate ends of the bars face each other for attachment at a single location to an object, a first clamp secured to said bars positioned intermediate the ends of said bars for clamping the concave surfaces of said bars around said object, to hold said device to said object, a ball-like swivel positioned adjacent said first clamp in such a way that when said first clamp is tightened said first clamp causes said concave surfaces to grip said object and also grips said ball-like swivel so it doesn't pivot too easily, said ball-like swivel having a stem, a second clamp secured to the distal end of the stem of said ball-like swivel for holding a pad or map, said second clamp comprising a first plate and a second plate, means biasing the distal ends of said plates together to tightly grip a pad or map, an elongated lever attached to said first plate, said elongated lever having one end pivotally attached to a distal end of said first plate and extending out therefrom, and other end of said lever curved upward for ease in lifting said lever and separating the first and second plates of said second clamp so said map or pad can be removed from said second clamp, said lever having a downwardly open recess formed intermediate its ends for holding a writing instrument.

2. The device as described in claim 1 therein, said pivotally attached elongated lever being pivotal through 180 degrees whereby said open recess in said lever faces upwardly to hold the writing instrument out of the way while the pad or map is being removed from the second clamp.

3. The device as described in claim 1 further comprises a layer of elastomeric material secured to the concave surfaces of the arcuate ends of said bars, so that the pad or map holding device will not mar the surface that the map holding device is attached to.

4. A pad or map holding device comprising a first bar and a second bar, one end of each bar generally arcuate for attachment to the rim of a steering wheel, the opposite end of each bar generally straight, said bars positioned so that concave surfaces of the arcuate ends of said bars face each other, said concave surfaces shaped to conform to the curvature of the rim of the steering wheel, a first clamp positioned intermediate said first and second bars for clamping the arcuate portions of the ends of said bars around the rim of the steering wheel, a generally ball-shaped swivel mounted between said bars beyond said first clamp and in such a way that when said first clamp is tightened the first clamp grips said generally ball-shaped swivel to prevent the swivel from moving too freely, said generally ball-shaped swivel having a stem, a second clamp mounted on a distal end of said stem for releasably holding map or pad to said second clamp whereby the stem attached to said second clamp and the generally ball-shaped swivel permits the pad or map to be pivoted to any position, one of said bars has a semi-cylindrical recess with opposed ends, said recess having a first bolt receiving hole extending therethrough, a bolt with a threaded shank, the threaded shank of said bolt extending through said hole in said one bar, a second hole formed in said other bar for receiving the shank of said bolt, the shank of said bolt extending through both holes, a nut threaded on said shank, whereby when said nut is tightened, the arcuate ends of the bars grip the rim of the steering wheel to hold a pad or map holding device on the steering wheel and to grip said spherical ball-like swivel so it won't rotate too easily, one end of said stem secured to said ball-like swivel extending in a direction between and parallel to the straight ends of said bars, a second clamp formed from two flat plates secured together by a resilient web, the opposite end of said stem secured to said web, said plates secured to said web and angled so the distal portions of said plates extend toward each other to hold the map or pad between them, a lever formed from a resilient material, said lever having opposed ends, one end of said lever pivotally secured to the distal end of one of the plates, the opposite end of said lever curved up so the lever can separate the plates of said second clamp to release the pad or map, said lever having a downwardly open recess positioned between the ends thereof for holding a writing instrument, said lever pivotal through 180 degrees so that when a pad or map is being removed from the clamp, the recess is upwardly open so it can hold the writing instrument out of the way.

* * * * *